United States Patent
Pursifull et al.

(10) Patent No.: US 9,022,007 B2
(45) Date of Patent: May 5, 2015

(54) THROTTLE VALVE SYSTEM FOR AN ENGINE

(75) Inventors: Ross Dykstra Pursifull, Dearborn, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 687 days.

(21) Appl. No.: 13/417,072

(22) Filed: Mar. 9, 2012

(65) Prior Publication Data

US 2013/0233276 A1    Sep. 12, 2013

(51) Int. Cl.
F02D 11/10    (2006.01)
F02D 9/02    (2006.01)

(52) U.S. Cl.
CPC . *F02D 9/02* (2013.01); *Y02T 10/146* (2013.01)

(58) Field of Classification Search
CPC ..... F02D 9/109; F02D 9/1095; F02D 9/1055; F02D 11/107; F02D 31/005; F02D 2041/227; F02D 2009/0252; F02D 2009/0277; F02D 2009/0279; F02D 2009/0281
USPC ........ 123/336, 337, 339.15, 339.28, 397, 398
See application file for complete search history.

(56) References Cited

U.S. PATENT DOCUMENTS

| | | | | |
|---|---|---|---|---|
| 4,491,109 A * | 1/1985 | Kishi et al. | ............... | 123/339.15 |
| 4,796,579 A * | 1/1989 | Wolfe et al. | ................... | 123/336 |
| 4,875,456 A * | 10/1989 | Tomisawa | ...................... | 123/585 |
| 5,343,840 A * | 9/1994 | Wataya et al. | ................ | 123/399 |
| 5,419,293 A * | 5/1995 | Nagai | ............................ | 123/336 |
| 6,092,505 A * | 7/2000 | Takahashi et al. | ............. | 123/399 |
| 6,155,533 A | 12/2000 | Semeyn et al. | | |
| 6,662,780 B2 * | 12/2003 | Yook | ............................. | 123/336 |
| 6,951,199 B2 | 10/2005 | Suzuki | | |
| 7,174,883 B2 | 2/2007 | Sonoda et al. | | |
| 7,584,742 B2 | 9/2009 | Bauerle et al. | | |
| 7,987,834 B2 * | 8/2011 | Itagaki | ......................... | 123/397 |
| 2004/0182363 A1 | 9/2004 | Suzuki | | |
| 2006/0060175 A1 | 3/2006 | Sonoda et al. | | |
| 2007/0084438 A1 * | 4/2007 | Garrick et al. | ................ | 123/396 |
| 2007/0295303 A1 | 12/2007 | Hirooka | | |
| 2008/0264059 A1 | 10/2008 | Hirooka | | |
| 2008/0267789 A1 * | 10/2008 | Hirooka | ....................... | 417/187 |
| 2009/0043477 A1 | 2/2009 | Oi et al. | | |
| 2010/0162994 A1 * | 7/2010 | Elsa er et al. | ................. | 123/337 |
| 2011/0132311 A1 | 6/2011 | Pursifull et al. | | |

\* cited by examiner

*Primary Examiner* — Erick Solis
(74) *Attorney, Agent, or Firm* — Julia Voutyras; Alleman Hall McCoy Russell & Tuttle LLP

(57) ABSTRACT

An embodiment of an engine is described. The engine includes a first throttle valve. The first throttle valve is provided in a first intake passage coupled to an intake manifold. The first throttle valve has a default closed position. The engine further includes a second throttle valve. The second throttle valve is provided in a second intake passage coupled to the intake manifold. The second throttle valve has a default open position. The engine further includes a venturi pump that is provided between the second throttle valve and the intake manifold. When the second throttle valve is in the default open position, intake air flows through the venturi pump.

20 Claims, 5 Drawing Sheets ical throttle control system that includes a fail-safe mechanism. The fail-safe mechanism positions a throttle valve in a default position in the event of degradation of the electronic throttle control system. In one example, the throttle valve has a default (unpowered) position of seven degrees from a closed position to provide intake air to the engine.

THROTTLE VALVE SYSTEM FOR AN ENGINE

BACKGROUND AND SUMMARY

Vehicles may use electronic throttle control (ETC) to adjust a throttle position in an internal combustion engine. Further, a desired throttle position may be determined by various sensors such as an accelerator pedal position sensor, an engine speed sensor, a vehicle speed sensor, etc. Once the desired throttle position is calculated, an electric motor within the ETC is driven to the desired throttle position. Further, ETC is integrated with other electronic features such as cruise control, traction control, stability control, and other controls that contribute to torque management. Due to this electronic control over the throttle position, the throttle can move regardless of a position of an accelerator pedal, which can be problematic if the ETC is unpowered. Therefore, ETC is often integrated with an ability to assume a default position such that at least some intake air can reach the engine to avoid stalling.

For example, U.S. Pat. No. 6,155,533 describes an electronic throttle control system that includes a fail-safe mechanism. The fail-safe mechanism positions a throttle valve in a default position in the event of degradation of the electronic throttle control system. In one example, the throttle valve has a default (unpowered) position of seven degrees from a closed position to provide intake air to the engine.

The inventors herein have recognized various issues with the above system. For example, the fail-safe mechanism required to position the throttle valve at a precise default position that is not a closed position adds significant cost to the electronic throttle control system.

Accordingly, in one example, some of the above issues may be at least partly addressed by an engine including a first throttle valve. The first throttle valve is provided in a first intake passage coupled to an intake manifold. The first throttle valve has a default closed position. The engine further includes a second throttle valve. The second throttle valve is provided in a second intake passage coupled to the intake manifold. The second throttle valve has a default open position. The engine further includes a venturi pump that is provided between the second throttle valve and the intake manifold. When the second throttle valve is in the default open position, intake air flows through the venturi pump.

The default open position of the second throttle provides intake air to the engine so that the first throttle valve may be designed with a default closed position. In other words, the default open position of the second throttle valve provides similar functionality of the fail-safe mechanism with regard to providing intake air to the engine. Thus, by providing the second throttle valve with the default open position, the mechanism to hold the first throttle valve at a precise default open position may be eliminated, while maintaining similar functionality. In this way, the production cost of the engine may be reduced.

In some embodiments, the second throttle valve may be configured to provide air flow through the venturi pump to supply vacuum to a vacuum consumption device. The second throttle valve in combination with the venturi pump may replace the functionality of an electrically-driven vacuum pump (or engine driven vacuum pump) that would otherwise be used to provide vacuum to a vacuum consumption device. As such, an electrically-driven vacuum pump may be eliminated from the engine. In this way, the production cost of the engine may be further reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
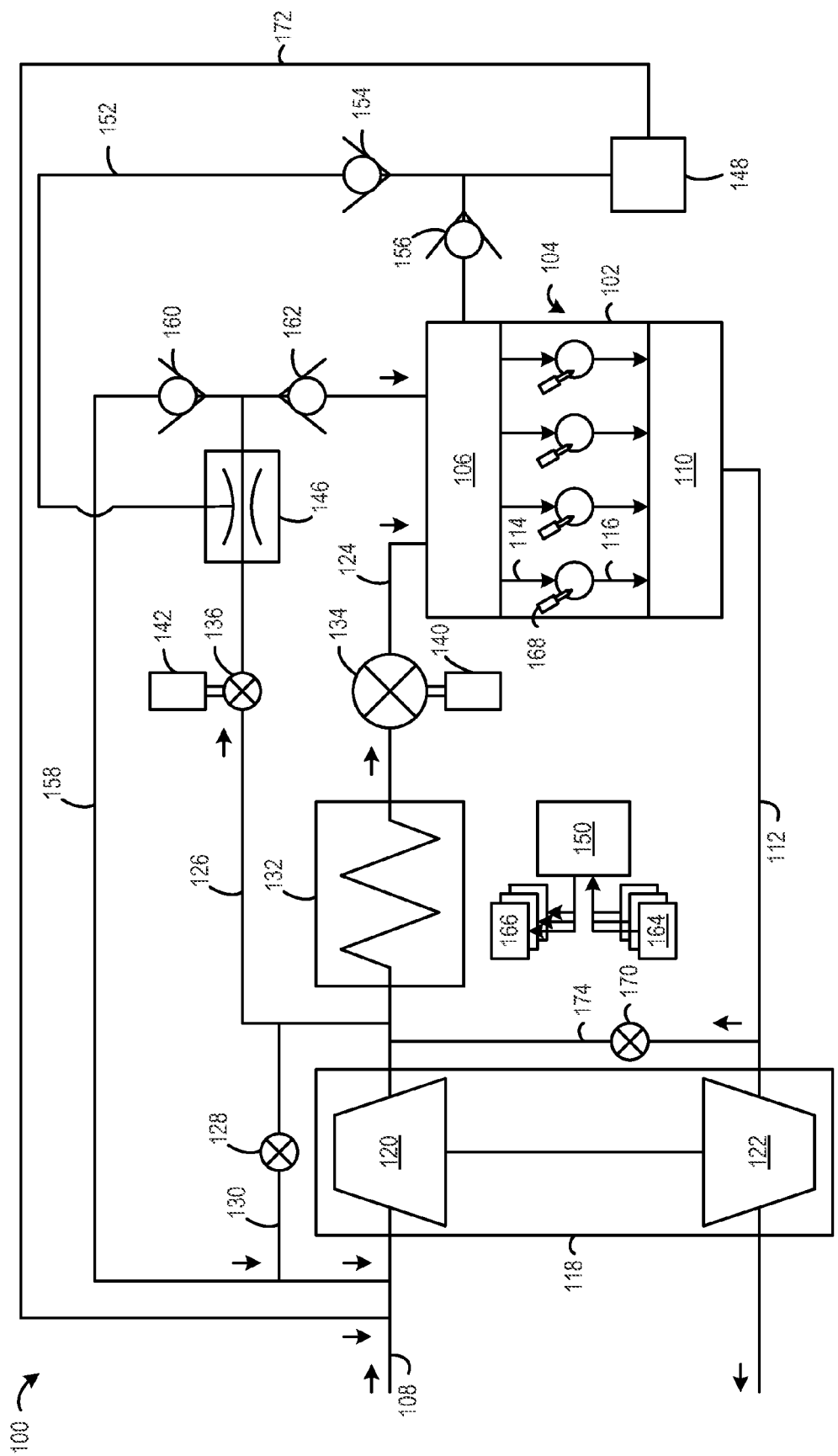
FIG. 1 shows an embodiment of a vehicle system including an engine of the present disclosure.

The following description relates to an electronic throttle control system in an engine that includes a first throttle valve and a second throttle valve. The first throttle valve and the second throttle valve may be arranged in such a way that the second throttle valve provides intake air flow when in a default position that allows the first throttle to a have a default position that is closed. This arrangement allows for the elimination of mechanisms for positioning the first throttle valve a precise default open position, which reduces the cost of the electronic throttle system.

Furthermore, the second throttle valve may provide air flow to a venturi pump to provide vacuum for a vacuum consumption device. In this case, the arrangement of the first throttle valve is simplified by the addition of the second throttle valve, and the second throttle valve serves the dual purpose of controlling air flow to the engine and the venturi pump. In this way, the second throttle valve may control an amount of vacuum that is supplied to a vacuum consumption device, and at least some intake air supplied to the engine.

In some embodiments, the second throttle valve may be operatively coupled with the first throttle valve such that when the first throttle valve is actuated the second throttle valve is actuated. In one example, the first throttle valve and the second throttle valve are operatively coupled to a motor. The motor may be controlled to actuate the first throttle valve and the second throttle valve to control air flow to the intake manifold. By using a single motor to actuate the first throttle valve and the second throttle valve, one less motor may be used relative to a configuration where each throttle valve is electronically controlled by a separate motor. In this way, the production cost of the engine may be further reduced.

In some embodiments, the engine may be controlled differently based on whether the first and/or second throttle valves become degraded. For example, during a degradation condition, the first and second throttle valves may be placed in their respective default positions, and may not be actuated. In one particular example, the first throttle valve may be closed and the second throttle valve may be open. In response to the degradation condition, a spark timing of the engine may be adjusted to meet a lesser of a torque demand or a torque limit that is based on air flow through the open second throttle valve and further through the venturi pump. Accordingly, even during degradation conditions, intake air may be provided through the venturi pump to generate vacuum for the vacuum consumption device and provided to the engine for combustion.

Furthermore, during a non-degradation condition where the first and second throttle valves may be actuated, the throttle valves may be controlled based on torque demand of the engine and a vacuum demand of the vacuum consumption device. For example, during a non-degradation condition, a position of the second throttle valve may be adjusted to control air flow to the intake manifold based on a torque demand before the first throttle valve is adjusted. Moreover, air flow through the second throttle valve may flow through the venturi pump to generate vacuum to meet a vacuum demand of the vacuum consumption device. Further, as torque demand increases beyond an air flow capability of the second throttle valve (e.g., the second throttle valve is fully open), a position of the first throttle valve may be adjusted to increase air flow to the intake manifold in order to meet the torque demand. Accordingly, the first and second throttle valves may be controlled to meet both the torque demand and the vacuum demand.

FIG. 1 is a schematic diagram of an embodiment of a vehicle system 100 that includes an internal combustion engine 102 that delivers power to propel the vehicle system 100. The engine 102 includes a plurality of cylinders 104. Each of the plurality of cylinders 104 may receive intake air from an intake manifold 106 via an air inlet 108 and may exhaust combustion gases via an exhaust manifold 110 to an exhaust passage 112. The intake manifold 106 and the exhaust manifold 110 can selectively communicate with each of the plurality of cylinders 104 via a corresponding intake valve 114 and exhaust valve 116. In some embodiments, each of the plurality of cylinders 104 may include two or more intake valves and/or two or more exhaust valves.

In some embodiments, an exhaust gas recirculation (EGR) system may route a desired portion of exhaust gas from the exhaust passage 112 to the air inlet 108 via an EGR passage 174. The amount of EGR provided to the air inlet 108 may be varied by a controller 150 via an EGR valve 170. Under some conditions, the EGR system may be used to regulate the temperature of the air and fuel mixture within the combustion chamber, thus providing a method of controlling the timing of ignition during some combustion modes.

The engine 102 may further include a compression device such as a turbocharger 118 including at least a compressor 120 arranged along the air inlet 108. The compressor 120 may be at least partially driven by a turbine 122 (e.g. via a shaft) arranged along the exhaust passage 112. The turbocharger 118 may increase the density of intake air provided to one or more of the plurality of cylinders 104 to increase combustion efficiency of the engine 102.

Downstream of an outlet of the compressor 120, the air inlet 108 splits into a first intake passage 124 and a second intake passage 126. The first intake passage 124 and the second intake passage 126 each may be coupled to the intake manifold 106, so that intake air that is compressed by the compressor 120 may flow through the first intake passage 124 and the second intake passage 126 to the intake manifold 106.

In some embodiments, a compressor-bypass valve 128 may be provided in a compressor-bypass passage 130. The compressor-bypass passage 130 may be coupled between the air inlet 108 and the second intake passage 126. The compressor-bypass valve 128 may allow compressed air to be recirculated into the air inlet 108 upstream of the compressor 120. For example, the compressor-bypass valve 128 may open to recirculate compressed air to the air inlet 108 to release pressure in the intake system of a turbocharged vehicle when a throttle is lifted or closed in order to reduce the effects of compressor surge loading. In one particular example, the compressor-bypass valve 128 is vacuum-actuated.

In some embodiments, an intercooler 132 may be provided in the first intake passage 124 downstream of the compressor 120. The intercooler 132 may cool intake air that has been heated due to compression by the compressor 120 in order to increase the density of the air charge provided to one or more of the plurality of cylinders 104. By increasing the air charge density combustion efficiency of the engine 102 may be increased.

A first throttle valve 134 may be provided in the first intake passage 124. The first throttle valve 134 may be positioned between an outlet of the intercooler 132 and the intake manifold 106. The first throttle valve 134 may be operatively coupled to a first motor 140. The first motor 140 may vary the position of the first throttle valve 134 via a signal provided to the first motor 140 by the controller 150, a configuration that is commonly referred to as electronic throttle control (ETC). In this manner, the first throttle valve 134 may be operated to vary the intake air provided to one or more of the plurality of cylinders 104 via the first intake passage 124. The first throttle valve 134 may have a default (or unpowered) position that is closed. In other words, the first throttle valve 134 may remain in the default closed position when the first motor 140 is not actuating the first throttle valve 134. When the first throttle valve 134 is in the default closed position, little or no intake air may flow through the first throttle valve 134 to the intake manifold 106 via the first intake passage 124.

In some embodiments, the first throttle valve 134 may be mechanically returned to the default closed position when the first motor 140 is not actuating the first throttle valve 134. For example, the first throttle valve 134 may be returned to the default closed position via a return spring or another biasing mechanism.

A second throttle valve 136 may be provided in the second intake passage 126. The second throttle valve 136 may be operatively coupled to a second motor 142. The second motor 142 may vary the position of the second throttle valve 136 via a signal provided to the second motor 142 by the controller 150. In this manner, the second throttle valve 136 may be operated to vary the intake air provided to one or more of the plurality of cylinders 104 via the second intake passage 126. In some embodiments, the second throttle valve 136 may have a default (or unpowered) position that is different from the default position of the first throttle valve 134. In one example, the default position of the second throttle valve 136 is an open position. In other words, the second throttle valve 136 may remain in an open position when the second motor 142 is not actuating the second throttle valve 136. In one particular example, the default position of the second throttle valve 136 may be a full open position in which a maximum amount of air flow may travel past the second throttle valve 136. In another example, the default position of the second throttle valve 136 may be a slightly open position (e.g., eight degrees open) in which some amount of air flow may travel pass the second throttle valve 136. Note the default position of the second throttle valve 136 may be set to a suitable position between closed and fully open without departing from the scope of the present description. When the second throttle valve 136 is in the default open position, air may flow through the second throttle valve 136 to the intake manifold 106 via the second intake passage 126.

In some embodiments, the second throttle valve 136 may be mechanically returned to the default open position when the second motor 142 is not actuating the second throttle valve 136. For example, the second throttle valve 136 may be returned to the default open position via a return spring or another biasing mechanism.

Although the first and second throttle valves are shown being controlled by separate motors, it will be appreciated that both of the first and second throttle valves may be operatively coupled to the same motor, and may be controlled by a single motor.

The second throttle valve 136 may provide a default open position to allow intake air to flow to the intake manifold 106, such as during a degradation condition or an idle condition, to reduce the likelihood of an engine stall. Since the second throttle valve 136 provides intake air flow to the intake manifold 106 in a default position, the first throttle valve 134 may be configured with a closed default position. In other words, the second throttle valve 136 provides the functionality of an open default position in a simplified form that allows for elimination of a costly mechanism to hold the first throttle valve 134 at a precise default position. This configuration maintains similar functionality to a single throttle valve that has a precise default open position, with reduced cost due to elimination of such a mechanism.

A venturi pump (e.g., ejector, aspirator, eductor, jet pump) 146 may be provided downstream of the second throttle valve 136 in the second intake passage 126. Note the second throttle valve 136 may be in-line with the venturi pump 146 valve, positioned upstream or downstream, without departing from the scope of the present description. In the illustrated embodiment, the venturi pump 146 may be positioned between the second throttle valve 136 and the intake manifold 106. The second throttle valve 136 may be adjusted to control a motive flow that travels through the venturi pump 146. For example, when the second throttle valve 136 is open (e.g., the default position), intake air (sometimes including crankcase gases, fuel vapor purge, or exhaust) may flow through the venturi pump 146 to create a motive force that generates a vacuum. The vacuum may be supplied from the venturi pump 146 to a vacuum consumption device 148 that may be fluidly coupled with the venturi pump 146 via a vacuum shaft 152. The second motor 142 may adjust the opening degree of the second throttle valve 136 to adjust the motive flow that travels through the venturi pump 146 to meet a vacuum demand of the vacuum consumption device 148.

In some embodiments, at least some of the motive flow for the venturi pump 146 may be provided from parts of the engine 102 other than the air inlet 108. In other words, the motive flow may include fluids other than intake air. For example, the motive flow for the venturi pump may include crankcase gases, fuel vapor purge, or exhaust.

A first check valve 154 may be provided in the vacuum shaft 152 between the venturi pump 146 and the vacuum consumption device 148. The first check valve 154 may be oriented to allow vacuum to be provided to the vacuum consumption device 148 and prevent vacuum from leaking from the vacuum consumption device 148 to the venturi pump 146. The vacuum shaft 152 may be coupled to the intake manifold 106. A second check valve 156 may be provided in the vacuum shaft 152 between the intake manifold 106 and the vacuum consumption device 148. The second check valve 156 may be oriented to allow vacuum to be provided to the vacuum consumption device 148 and prevent vacuum from leaking from the vacuum consumption device 148 to the intake manifold 106.

The vacuum consumption device 148 may include one or more suitable components that apply vacuum to perform a task related to engine or vehicle operation. For example, the vacuum consumption device 148 may include at least one of a brake booster, a crankcase ventilation system, a fuel vapor purge canister, or another vacuum actuator. In some embodiments, a vacuum demand of the vacuum consumption device 148 may be based on a design of the device. In some embodiments, the vacuum demand may be based on operating conditions.

In some embodiments, the vacuum consumption device 148 may vent or purge fluids to the air inlet 108 via a purge passage 172. In an example where the vacuum consumption device includes a crankcase ventilation system, crankcase gases may be vented through the purge passage 172 via the vacuum provided by the venturi pump 146. Similarly, in an example where the vacuum consumption device includes a fuel vapor canister, fuel vapors may be purged through the purge passage 172 via the vacuum provided by the venturi pump 146. It will be appreciated that the purge passage may connect to various suitable points in the intake passages upstream of the first and second throttle valves without departing from the scope of the present description.

A return passage 158 may be coupled between the second intake passage 126 and the air inlet 108. In particular, the return passage 158 may be coupled to a point downstream of an outlet of the venturi pump 146 and upstream of the intake manifold 106. A third check valve 160 may be provided in the return passage 158 between the outlet of the venturi pump 146 and the air inlet 108. The third check valve 160 may be oriented to allow intake air to be provided to the air inlet 108 and prevent intake air from entering the second intake passage 126. A fourth check valve 162 may be provided in the second intake passage 126 between the outlet of the venturi pump 146 and the intake manifold 106. The fourth check valve 162 may be oriented to allow motive air flowing from the venturi pump 146 to be provided to the intake manifold 106 and prevent compressed air from exiting the intake manifold 106 into the second intake passage 126. The placement of the check valves and the venturi pump inlet and outlet are placed such that the venturi inlet is positioned in a highest or near highest pressure node and the venturi outlet is positioned in a lowest or near lowest pressure node. Note one or more of the check valves may be omitted in some embodiments without departing from the scope of the present disclosure.

The second throttle valve 136 in combination with the venturi pump 146 may replace the functionality of an electrically-driven vacuum pump that would otherwise be used to provide vacuum to the vacuum consumption device 148. As such, an electrically-driven vacuum pump (or an engine-driven vacuum pump) may be eliminated from the engine 102. In this way, the production cost of the engine may be further reduced.

Ignition system 168 can provide an ignition spark to the plurality of cylinders 104 via spark plugs in response to spark advance signal from the controller 150, under select operating modes. The controller 150 may adjust a spark timing of one or more of the plurality of cylinders based on operating conditions in order to meet a torque demand.

The controller 150 may include microprocessor unit, input/output ports, an electronic storage medium (e.g., read only memory chip) for executable programs and calibration values, random access memory, keep alive memory, and a data bus. The controller 150 may receive various signals and information from sensors 164 coupled to the engine 102 and corresponding components of the vehicle system 100, including measurement of inducted mass air flow (MAF); engine coolant temperature (ECT); a profile ignition pickup signal (PIP); throttle position (TP); absolute manifold pressure signal (MAP), ambient pressure ambient temperature, among other suitable sensor signals. Note that more than one of these sensors may be implemented in the vehicle system 100 without departing from the scope of the present description. For example, MAF and MAP sensors may be positioned in each of the first and second intake passages.

The controller 150 may control operation of actuators 166 based signals indicative of operating parameters that received from the sensors 164. For example, the controller 150 may be configured to control the first motor 140 to actuate the first throttle valve 134 and the second motor 142 to actuate the second throttle valve 136 based on one or more operating parameters including MAF, MAP, ECT, etc. The controller 150 may be programmed with computer readable data representing instructions executable by a processor of the controller 150 for performing methods of controlling positions of the first and second throttle valve via actuation of a single motor based on one or more operating parameters, as well as variations thereof.

In one example, the controller 150 may be configured to, during a non-degradation condition adjust a position of the first throttle valve 134 and/or the second throttle valve 136 to control air flow to the intake manifold 106 based on a torque demand or a MAP demand. In particular, the controller 150 may be configured to actuate the second throttle valve 136 with increasing air flow rate or MAP demand. Once the second throttle valve 136 is fully open, then the controller 150 may be configured to actuate the first throttle valve 134 to provide additional air control to meet increased air flow rate or MAP demand beyond the capability of the second throttle valve 136.

Furthermore, the controller 150 may be configured to, during a degradation condition where the first and second throttle valves are in their respective default positions, adjust a spark timing of the ignition system 168 to meet a lesser of the torque demand or a torque limit that is based on air flow through the second throttle valve 136 or the venturi pump 146. In particular, since the first throttle valve 134 is in a default closed position, intake air only flows through the venturi pump 146 in the second intake passage 126 to reach the intake manifold 106. As such, the torque output of the engine may be limited by the amount of intake air that flows through the second throttle valve 136 or the venturi pump 146.

In one example, a non-degradation condition may include a condition where the controller 150 is able to actuate the first throttle valve 134 and the second throttle valve 136 (e.g., normal operation). In one example, a degradation condition may include a condition where the controller 150 is not able to actuate the first throttle valve 134 and/or the second throttle valve 136, and the first and second throttle valve are placed in their respective default positions.

In one example, the controller 150 may be configured to regulate the vacuum draw through the venturi pump 146 by adjusting the second throttle valve 136 to throttle the motive flow based on an operating condition. In one example, the operating condition includes a vacuum demand of the vacuum consumption device 148. In another example, the operating condition may include an air/fuel ratio. More particularly, the controller 150 may be configured to adjust the second throttle valve 136 to throttle flow through the venturi pump 146 to control an amount of exhaust gas, fuel vapor, or crankcase gases that is recirculated to the intake passage. By adjusting the second throttle valve 136 to regulate vacuum of the venturi pump 146, a separate purge valve for the vacuum consumption device 148 may be eliminated from the design of the engine, and the recirculation of gases from the vacuum consumption device 148 may be controlled by the second throttle valve 136.

Figure 2:
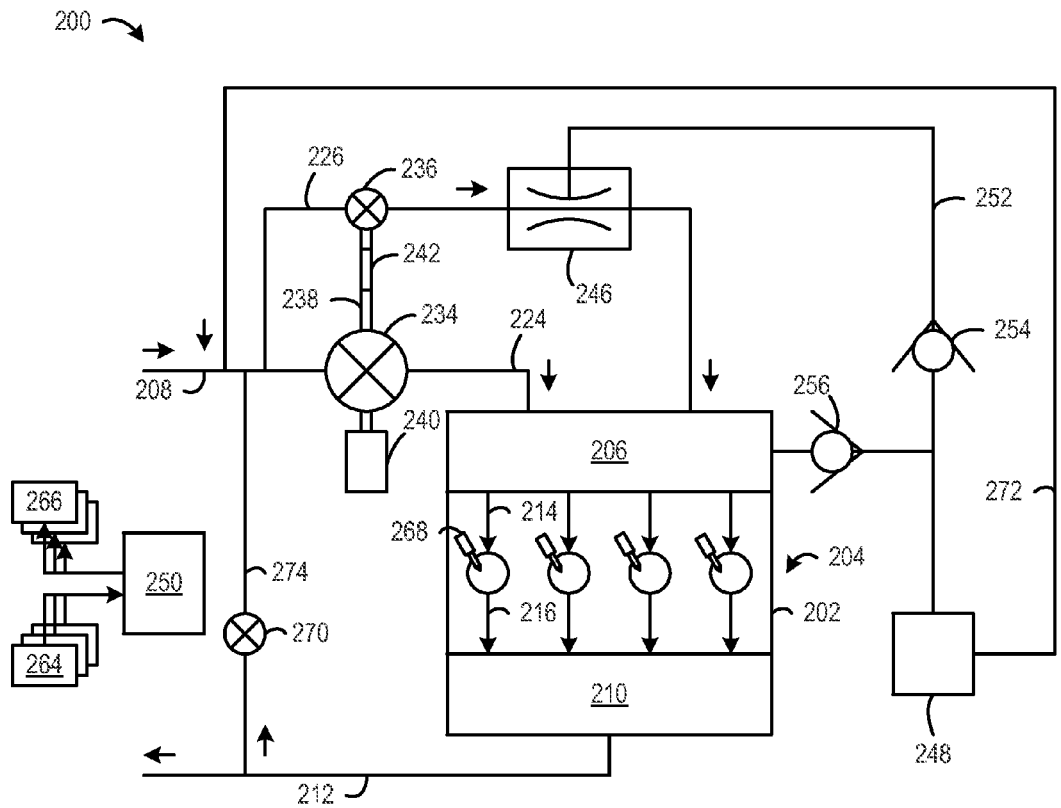
FIG. 2 shows another embodiment of a vehicle system including an engine of the present disclosure.

FIG. 2 is a schematic diagram of an embodiment of a vehicle system 200 that includes an internal combustion engine 202 that is naturally aspirated. In other words, the vehicle system 200 does not include a compression device to compress intake air that is provided to the plurality of cylinders 204. Furthermore, the first and second throttle valve may be operatively coupled to a single motor. Components of the vehicle system 200 that may be substantially the same as those of the vehicle system 100 are identified in the same way and are described no further. However, it will be noted that components identified in the same way in different embodiments of the present disclosure may be at least partly different.

The air inlet 208 splits into the first intake passage 224 and the second intake passage 226. The first throttle valve may be provided at a point in the first intake passage 224 downstream of the split between the first intake passage 224 and the second intake passage 226. The second throttle valve 236 may be provided at a point in the second intake passage 226 downstream of the split between the first intake passage 224 and the second intake passage 226. The venturi pump 246 may be provided in the second intake passage 226 between the second throttle valve 236 and the intake manifold 206.

In some embodiments, intake air flow may be preferentially routed through the second throttle valve to the venturi pump 246 via the second intake passage 226. In other words, under some conditions intake air may be routed through the second throttle valve 236, which may be in an open position, and the first throttle valve may be in a closed default position. For example, during low air flow conditions, the second throttle may be opened and the first throttle may be closed. In this way, vacuum may be provided for the vacuum consumption device 248 even during low air flow conditions. The combination of the second throttle valve 236 and the venturi pump 246 collectively act as a "valved venturi pump" that may be used to adjust a level of vacuum provided to the vacuum consumption device 248. The valved venturi pump may provide an economic replacement for an electronic vacuum pump, which may reduce the cost of the engine.

In some embodiments, the second throttle valve 236 may be coupled to the first throttle valve 234 such that when the first throttle valve 234 is actuated the second throttle valve 236 is actuated. For example, the first and second throttle valves may be operatively coupled to a motor 240 via a shaft 238, and the motor 240 may rotate the shaft 238 to actuate the first and second throttle valves. By using a single motor to actuate the first throttle valve and the second throttle valve, one less motor may be used relative to a configuration where each throttle valve is electronically controlled by a separate motor. In this way, the production cost of the engine may be further reduced. However, it will be appreciated that, in some embodiments, the second throttle valve 236 may be controlled by a second motor (not shown) without departing from the scope of the present disclosure. Accordingly, each of the first and second throttle valves may be controlled by separate motors.

In some embodiments, the motor 240 (or an associated linkage) may include a lost-motion mechanism 242 that actuates the second throttle valve 236 before the first throttle valve 234 is actuated away from a default position. The second throttle valve 236 may be actuated before the first throttle valve 234 to provide a finer adjustment of intake air flow to the intake manifold 206, relative to a configuration where both throttle valves are actuated simultaneously. For example, an opening of the second throttle valve 236 may be decreased to meet a torque demand, before the first throttle valve 234 is opened.

Figure 3:
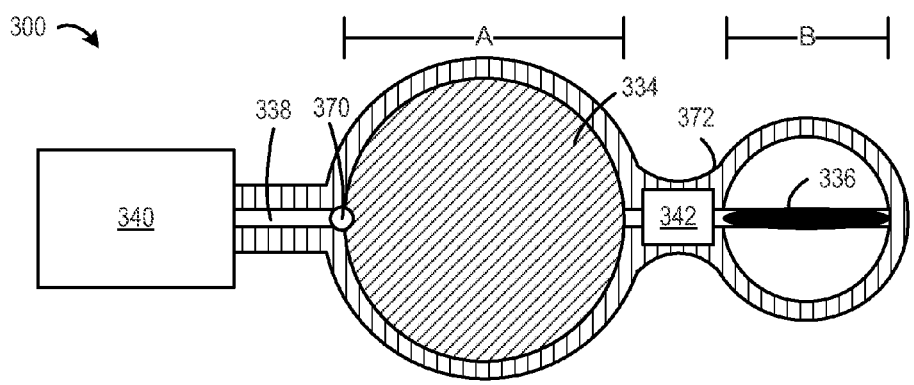
FIG. 3 shows an embodiment of an electronically controlled throttle system of the present disclosure.

FIG. 3 shows an embodiment of an electronically controlled throttle system 300 of the present disclosure. In one example, the electronically controlled throttle system 300 may be implemented in the vehicle system 100 shown in FIG. 1 or the vehicle system 200 shown in FIG. 2. The electronically controlled throttle system 300 includes a throttle body 372 that includes a first throttle valve 334 and a second throttle valve 336. The throttle body 372 may be operatively coupled with the first intake passage 224 and the second intake passage 226 (shown in FIG. 2). The first throttle valve 334 and the second throttle valve 336 coupled to a shaft 338. The shaft 338 may be coupled to a motor 340. The motor 340 may control a position of the first throttle valve 334 and a position of the second throttle valve 336 by rotating the shaft 338 such that when the first throttle valve is actuated the second throttle valve is actuated. In some embodiments, the motor 340 may include an electric motor that is coupled to an intermediate gear box and a sensor to detect a position of the motor or the shaft. A bias mechanism 370 operatively coupled to the shaft 338 may return the first throttle valve 334 to the default closed position and the second throttle valve 336 to the default open position when the motor 340 is not rotating the shaft 338. In this arrangement, the second throttle valve 336 provides air flow to the venturi pump and the engine (even during a degradation condition), so that the first throttle valve 334 can have a default closed position and a mechanism to maintain the first throttle valve at a precise default position (e.g., seven degrees open) can be eliminated.

The first throttle valve 334 has a diameter (A) and the second throttle valve 336 has a diameter (B) that is less than the diameter A. In one particular example, the first throttle valve has a diameter of sixty millimeters and the second throttle valve has a diameter that is twelve millimeters. The first throttle valve 334 and the second throttle valve 336 are both substantially circular in shape. Accordingly, a cross-sectional area of the second throttle valve 336 is less than a cross-sectional area of the first throttle valve 334. In some embodiments, the size of the throttle valves may have a diameter that is larger than a diameter of a corresponding intake passage. For example, the second throttle valve may have a diameter that is twelve millimeters and a throat diameter of the venturi pump may be four millimeters.

In some embodiments, the motor 340 (or an associated linkage) may include a lost-motion mechanism 342 that actuates the second throttle valve 336 before the first throttle valve 334 is actuated away from a default position. For example, the lost-motion mechanism 342 may allow for a decrease in the opening of the second throttle valve 336 before the first throttle valve 334 is opened. The lost-motion mechanism 342 may allow for a finer adjustment of air flow relative to a configuration where both throttle valves are opened simultaneously.

Figure 6:
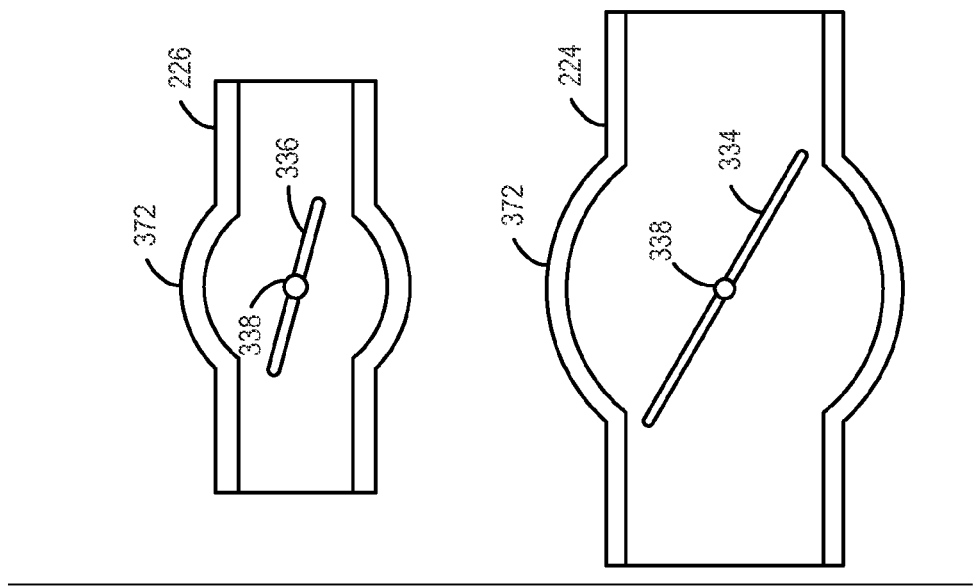
FIGS. 4-6 show various positions of the first and second throttle valves of the electronically controlled throttle system shown in FIG. 3.
Figure 5:
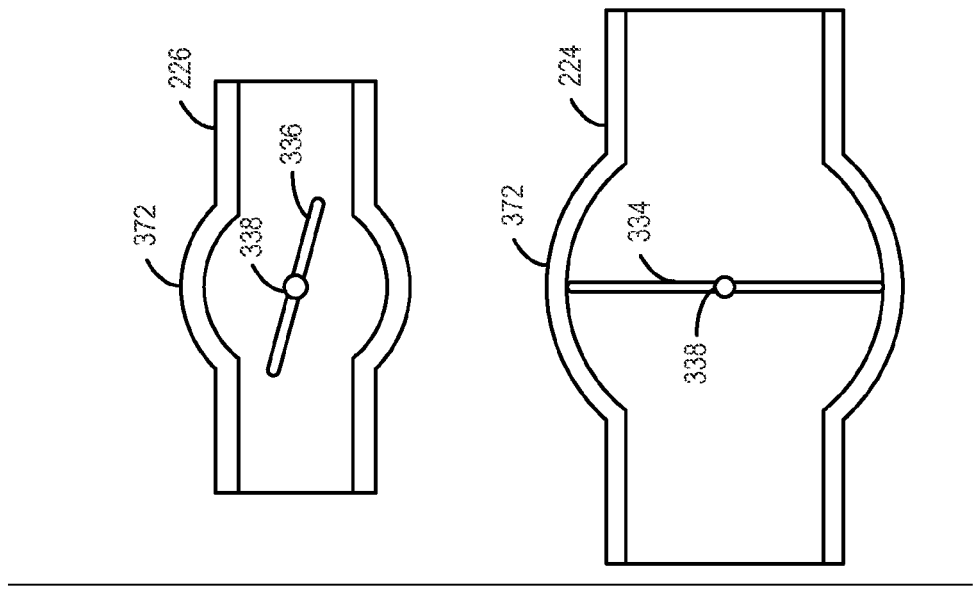
Figure 4:
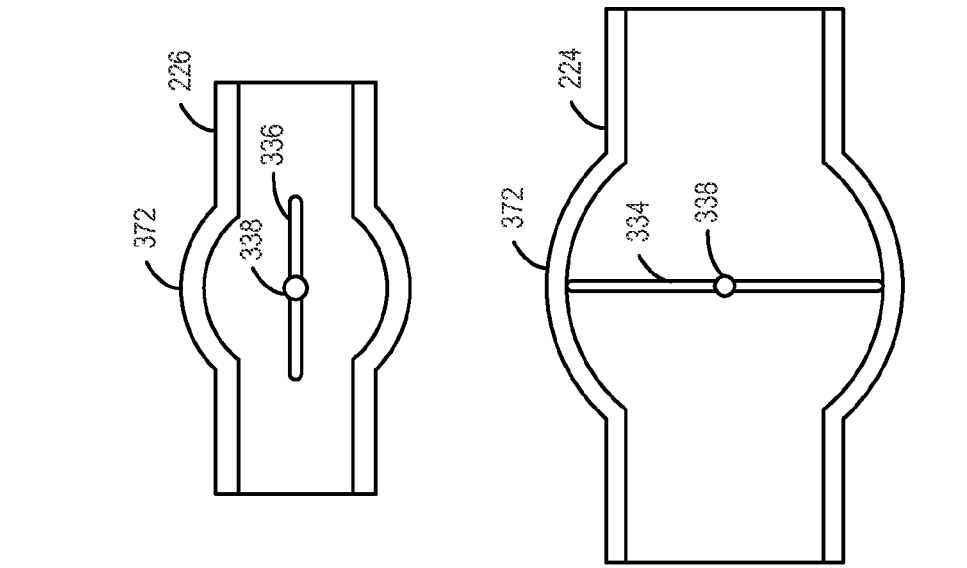

FIGS. 4-6 show various positions of the first throttle valve 334 and the second throttle valve 336. The design of the electronically controlled throttle system 300 allows a common actuator to operate the two valves, thereby providing component reduction. Operation of the actuator may change a position of the common shaft, to thereby adjust the opening and closing of each of the coupled valves.

FIG. 4 shows an embodiment of the electronically controlled throttle system 300 where the first and second throttle valves are in respective default positions. In particular, the first throttle valve 334 is in a default closed position. The first throttle valve 334 may be closed to have no throttle opening area such that substantially no air flow may leak between the first throttle valve 334 and the throttle body 372. At the same time, the second throttle valve 336 is in a default open position. The second throttle valve 336 may be open to have a maximum throttle opening area such that air flow may pass through the throttle body 372.

FIG. 5 shows another embodiment of the electronically controlled throttle system 300 where the first and second throttle valves are in respective default positions. In particular, the first throttle valve 334 is in a default closed position. The first throttle valve 334 may be closed to have no throttle opening area such that substantially no air flow may leak between the first throttle valve 334 and the throttle body 372. At the same time, the second throttle valve 336 is in a default open position. The second throttle valve 336 may be oriented to have a throttle opening area that is less than a maximum throttle opening area such that a throttled amount of air flow may pass through the throttle body 372.

FIG. 6 shows the electronically controlled throttle system 300 where the first and second throttle valves are actuated away from their default positions. In particular, the shaft 338 is rotated such that the first and second throttle valves throttle flow through the intake passages. The first and second throttle valves may be controlled in this manner in order to control the recirculation of gases from the vacuum consumption device to the intake passages when applicable. For example, the second throttle valve 136 may be adjusted to throttle flow through the venturi pump 146 to adjust the vacuum in order to control an amount of exhaust gas, fuel vapor, or crankcase gases that is recirculated to the intake passage.

In some embodiments, the throttle body 372 may be designed to allow the first throttle valve or the second throttle valve to rotate without adjusting a throttle opening area. For example, the throttle body may be larger than a connecting intake passage, and the throttle valves may rotate in the throttle body such that substantially no air leaks between the throttle valves and the throttle body. In other words, when the throttle valves are rotated via the shaft, the throttle valves are open for a portion of the angular rotation.

Figure 7:
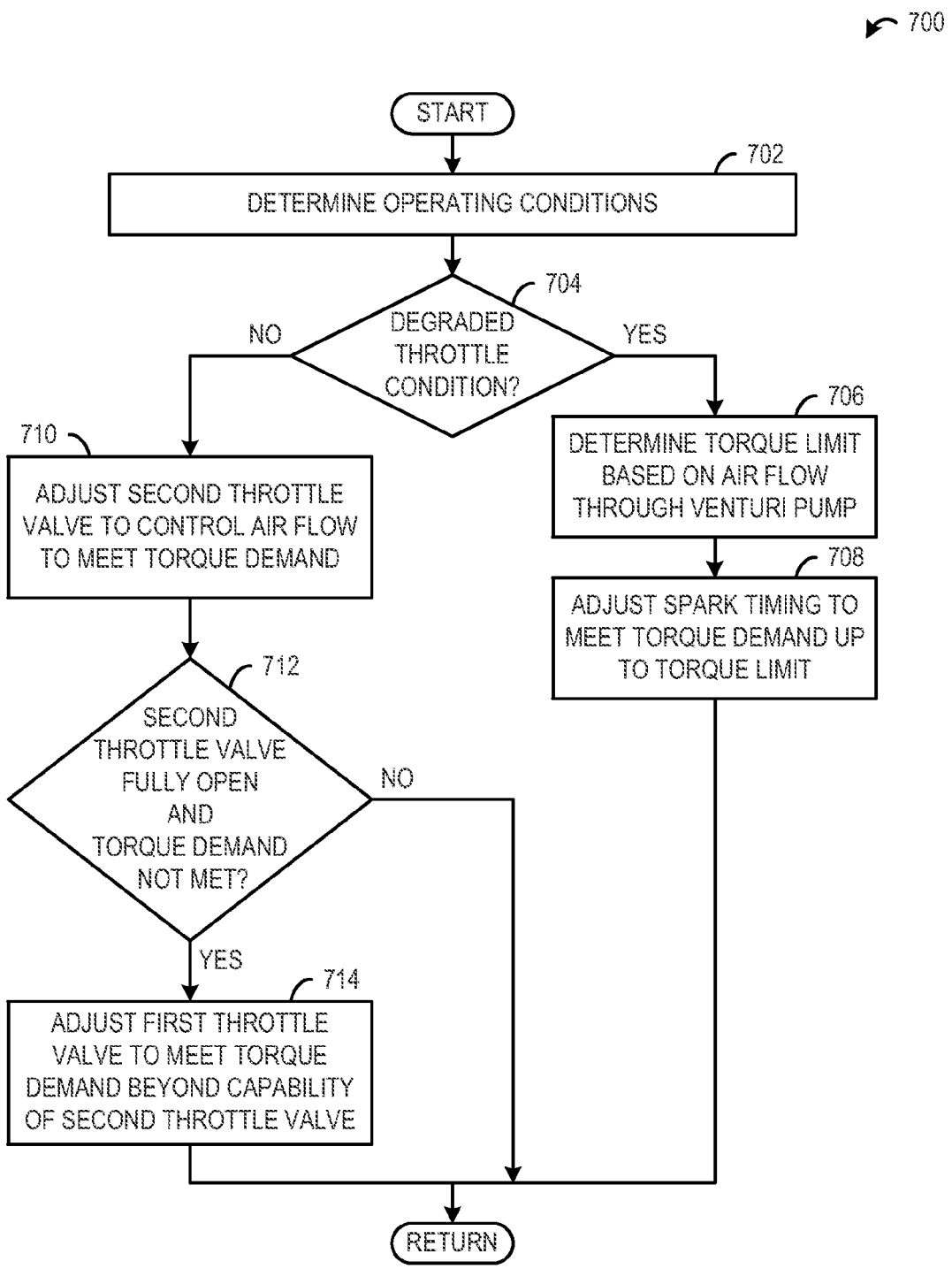
FIG. 7 shows an embodiment of a method to control an engine of the present disclosure.

FIG. 7 shows an embodiment of a method 700 for controlling an engine. For example, the method 700 may be performed by the controller 150 shown in FIG. 1 or the controller 250 shown in FIG. 2. At 702, the method 700 includes determining operating conditions. Determining operating conditions may include receiving various signals and information from sensors coupled to the engine.

At 704, the method 700 includes determining whether there is a throttle degradation condition. A throttle degradation condition may include a condition where one or more of the throttles cannot be accurately controlled. In one example, a throttle degradation condition occurs when a motor coupled to a throttle valve becomes degraded and cannot actuate the throttle valve. If a throttle degradation condition exists, then the method 700 moves to 706. Otherwise, the method 700 moves to 710.

During a throttle degradation condition, the first and second throttle valves may be placed in their respective default (or unpowered) positions. In particular, the first throttle valve may be closed and the second throttle valve may be open. At 706, the method 700 includes determining a torque limit of the engine based on an amount of air flow that is provided to the intake manifold from the outlet of the venturi pump. Since the first throttle valve is closed, the only air flow that is provided to the intake manifold passes through second throttle valve and the venturi pump.

At 708, the method 700 includes adjusting a spark timing to meet the lesser of a torque demand or the torque limit that is based on air flow through the venturi pump. During the throttle degradation condition neither of the valves may be operable to adjust an amount of air flow provided to the engine. Accordingly, the spark timing may be advanced or retarded to meet the torque demand up to the torque limit.

At 710, the method 700 includes adjusting a position of the second throttle valve to control air flow to the intake manifold based on a torque demand. The second throttle valve may be adjusted to meet torque demands while the first throttle valve remains closed. This may be achieved by using separate motors to control each of the throttle valves, or a single motor and a lost motion mechanism depending on implementation.

At 712, the method 700 includes determining whether the second throttle valve is fully open and the torque demand is not met. If the second throttle valve is fully open and the torque demand is not met, then the torque demand is greater than the air flow capability of the second throttle valve. Accordingly, the method 700 moves to 714. Otherwise, the method 700 returns to other operations.

At 714, the method 700 includes adjusting the position of the first throttle valve to control air flow to meet the torque demand beyond the capability of the second throttle valve. In other words, the first throttle valve is adjusted so that the air flow through the first and second throttle valves collectively meets the torque demand.

Figure 8:
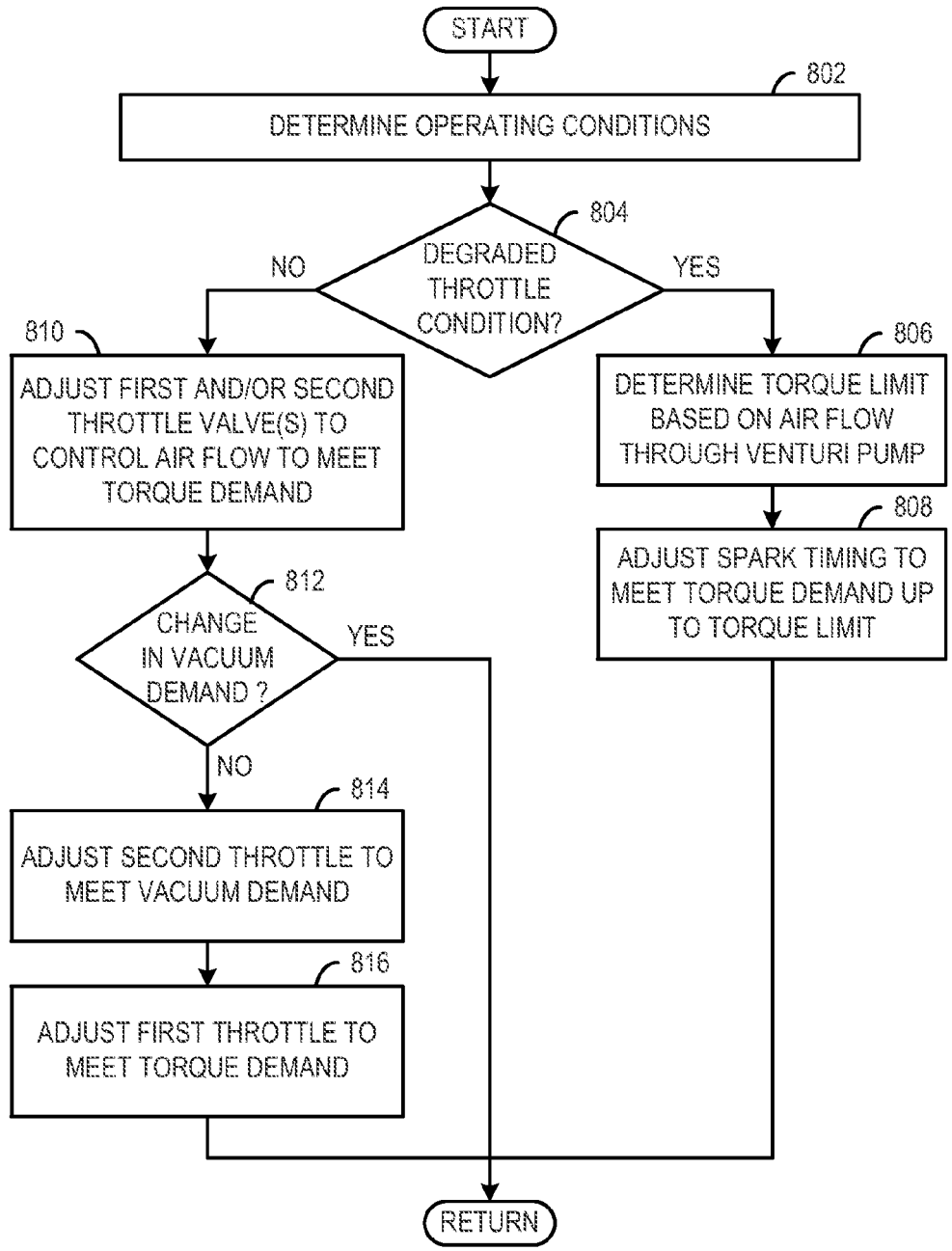
FIG. 8 shows another embodiment of a method to control an engine of the present disclosure.

FIG. 8 shows an embodiment of a method 800 for controlling an engine. For example, the method 800 may be performed by the controller 150 shown in FIG. 1 or the controller 250 shown in FIG. 2. At 802, the method 800 includes determining operating conditions. Determining operating conditions may include receiving various signals and information from sensors coupled to the engine.

At 804, the method 800 includes determining whether there is a throttle degradation condition. A throttle degradation condition may include a condition where one or more of the throttles cannot be accurately controlled. In one example, a throttle degradation condition occurs when a motor coupled to a throttle valve becomes degraded and cannot actuate the throttle valve. If a throttle degradation condition exists, then the method 800 moves to 806. Otherwise, the method 800 moves to 810.

During a throttle degradation condition, the first and second throttle valves may be placed in their respective default (or unpowered) positions. In particular, the first throttle valve may be closed and the second throttle valve may be open. At 806, the method 800 includes determining a torque limit of the engine based on an amount of air flow that is provided to the intake manifold from the outlet of the venturi pump. Since the first throttle valve is closed, the only air flow that is provided to the intake manifold passes through second throttle valve and the venturi pump.

At 808, the method 800 includes adjusting a spark timing to meet the lesser of a torque demand or the torque limit that is based on air flow through the venturi pump. During the throttle degradation condition neither of the valves may be operable to adjust an amount of air flow provided to the engine. Accordingly, the spark timing may be advanced or retarded to meet the torque demand up to the torque limit.

At 810, the method 800 includes adjusting a position of the first throttle valve or the second throttle valve to control air flow to the intake manifold based on a torque demand. In some embodiments, the first throttle valve and the second throttle valve may be adjusted separately via different motors. In some embodiments, the first throttle valve and the second throttle valve may be adjusted collectively via the same motor.

At 812, the method 800 includes determining whether there is a change a vacuum demand. Vacuum demand may change based on operation of the vacuum consumption device or operating conditions. In particular, vacuum demand may change to control an amount of exhaust gas, fuel vapor, or crankcase gases that is recirculated to the intake passage when the second throttle valve and the venturi pump are used in place of a separate purge valve. If there is a change in vacuum demand, the method 800 moves to 814. Otherwise, the method 800 returns to other operations.

At 814, the method 800 includes adjusting the position of the second throttle valve to control air flow through the venturi pump based on the vacuum demand. For example, if vacuum demand is increased the second throttle valve may be adjusted to increase the throttle opening area to provide more air flow through the venturi pump to increase the vacuum generated by the venturi pump and meet the vacuum demand.

At 816, the method 800 includes adjusting the position of the first throttle valve to compensate for a change in position of the second throttle valve to meet the torque demand. For example, if the throttle opening area of the second throttle valve is increased to increase air flow through the venturi pump to meet the increase in vacuum demand, then the opening area of the first throttle valve may be decreased to reduce air flow through the first throttle valve to compensate for the increase in air flow through the second throttle valve. Accordingly, air flow control accuracy may be maintained. Note in some embodiments where the first and second throttle valves are collectively adjusted via rotation of a single shaft, this step may be omitted.

It will be appreciated that the use of the second throttle valve in combination with the first throttle valve allows for a simplification in design of the first throttle valve, while providing the same functionality as a throttle valve having a precise default open position. In particular, the dual throttle valve configuration allows for the elimination of a costly mechanism to maintain the first throttle valve in a precise default open position, an electric or motor driven vacuum pump, or purge valves. Accordingly, the production cost of the engine may be reduced.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine comprising:
 a first throttle valve, in a first passage coupled to an intake manifold, having a default closed position;
 a second throttle valve, in a second passage coupled to the intake manifold, having a default open position; and
 a venturi pump, in-line with the second throttle valve and the intake manifold, wherein intake air flows through the venturi pump when the second throttle valve is in the default open position.

2. The engine of claim 1, wherein a cross-sectional area of the second throttle valve is less than a cross-sectional area of the first throttle valve.

3. The engine of claim 1, further comprising:
 a vacuum consumption device fluidly coupled with the venturi pump, wherein a motive flow travels through the venturi pump to supply vacuum to the vacuum consumption device when the second throttle valve is in the default open position.

4. The engine of claim 3, wherein the vacuum consumption device includes at least one of a brake booster, a crankcase ventilation system, and a fuel vapor purge canister.

5. The engine of claim 3, wherein the motive flow includes at least some crankcase gases, fuel vapor purge, or exhaust.

6. The engine of claim 1, further comprising:
 a motor operatively coupled to the first throttle valve and the second throttle valve to control a position of the first throttle valve and a position of the second throttle valve.

7. The engine of claim 6, wherein the motor includes a lost-motion mechanism configured to actuate the second throttle valve before the first throttle valve is actuated from the default closed position.

8. The engine of claim 1 further comprising:
 a controller configured to adjust a position of the first throttle valve or the second throttle valve to control air flow to the intake manifold based on a torque demand, and in response to a change in a vacuum demand, adjust the position of the second throttle valve to control air flow through the venturi pump based on the vacuum demand.

9. The engine of claim 8, wherein the controller is configured to in response to the change in vacuum demand, adjust the position of the first throttle valve to compensate for a change in position of the second throttle valve to meet the torque demand.

10. The engine of claim 8, wherein the controller is configured to during a degradation condition, adjust a spark timing to meet a lesser of the torque demand or a torque limit that is based on air flow through the venturi pump.

11. A method for controlling an engine including a first throttle valve, in a first intake passage coupled to an intake manifold, having a default closed position, a second throttle valve, in a second intake passage coupled to the intake manifold, having a default open position, and a venturi pump, in the second intake passage in-line with the second throttle valve and the intake manifold, the venturi pump being configured to provide vacuum to a vacuum consumption device, comprising:
 adjusting a position of the first throttle valve or the second throttle valve to control air flow to the intake manifold based on a torque demand; and
 in response to a change in a vacuum demand, adjusting the position of the second throttle valve to control air flow through the venturi pump based on the vacuum demand.

12. The method of claim 11, further comprising:
 in response to the change in vacuum demand, adjusting the position of the first throttle valve to compensate for a change in position of the second throttle valve to meet the torque demand.

13. The method of claim 11, wherein the vacuum demand includes controlling recirculation of an amount of crankcase gases, fuel vapor purge, or exhaust from the vacuum consumption device.

14. The method of claim 11, further comprising:
 during a degradation condition, adjusting a spark timing to meet a lesser of the torque demand or a torque limit that is based on air flow through the venturi pump.

15. An engine comprising:
 a first throttle valve, in a first intake passage coupled to an intake manifold, having a default closed position;
 a second throttle valve, in a second intake passage coupled to the intake manifold, having a default open position;
 a venturi pump in the second intake passage between the second throttle valve and the intake manifold, wherein air flows through the venturi pump when the second throttle valve is in the second default position; and
 a motor, operatively coupled to the first throttle valve and the second throttle valve via a shaft, the motor being configured to rotate the shaft to control a position of the first throttle valve and a position of the second throttle valve.

16. The engine of claim 15, wherein a cross-sectional area of the second throttle valve is less than a cross-sectional area of the first throttle valve.

17. The engine of claim 15, wherein the motor includes a lost-motion mechanism that actuates the second throttle valve before the first throttle valve is actuated away from the first default position.

18. The engine of claim 15, wherein the vacuum consumption device includes at least one of a brake booster, a crankcase ventilation system, and a fuel vapor purge canister.

19. The engine of claim 15, further comprising:
 a controller configured to adjust a position of the first throttle valve and the second throttle valve to control air flow to the intake manifold based on a torque demand, and in response to a change in a vacuum demand, adjust the position of the second throttle valve to control air flow through the venturi pump based on the vacuum demand.

20. The engine of claim 19, wherein the controller is configured to during a degradation condition, adjust a spark timing to meet a lesser of the torque demand or a torque limit that is based on air flow through the venturi pump.

* * * * *